A. W. BURKE.
EXCESS WATTMETER.
APPLICATION FILED AUG. 23, 1915.

1,284,230.

Patented Nov. 12, 1918.
2 SHEETS—SHEET 1.

Inventor:
Alfred W. Burke,
Byrnes, Townsend & Beckenstein,
Att'ys.

A. W. BURKE.
EXCESS WATTMETER.
APPLICATION FILED AUG. 23, 1915.
1,284,230.
Patented Nov. 12, 1918.
2 SHEETS—SHEET 2.
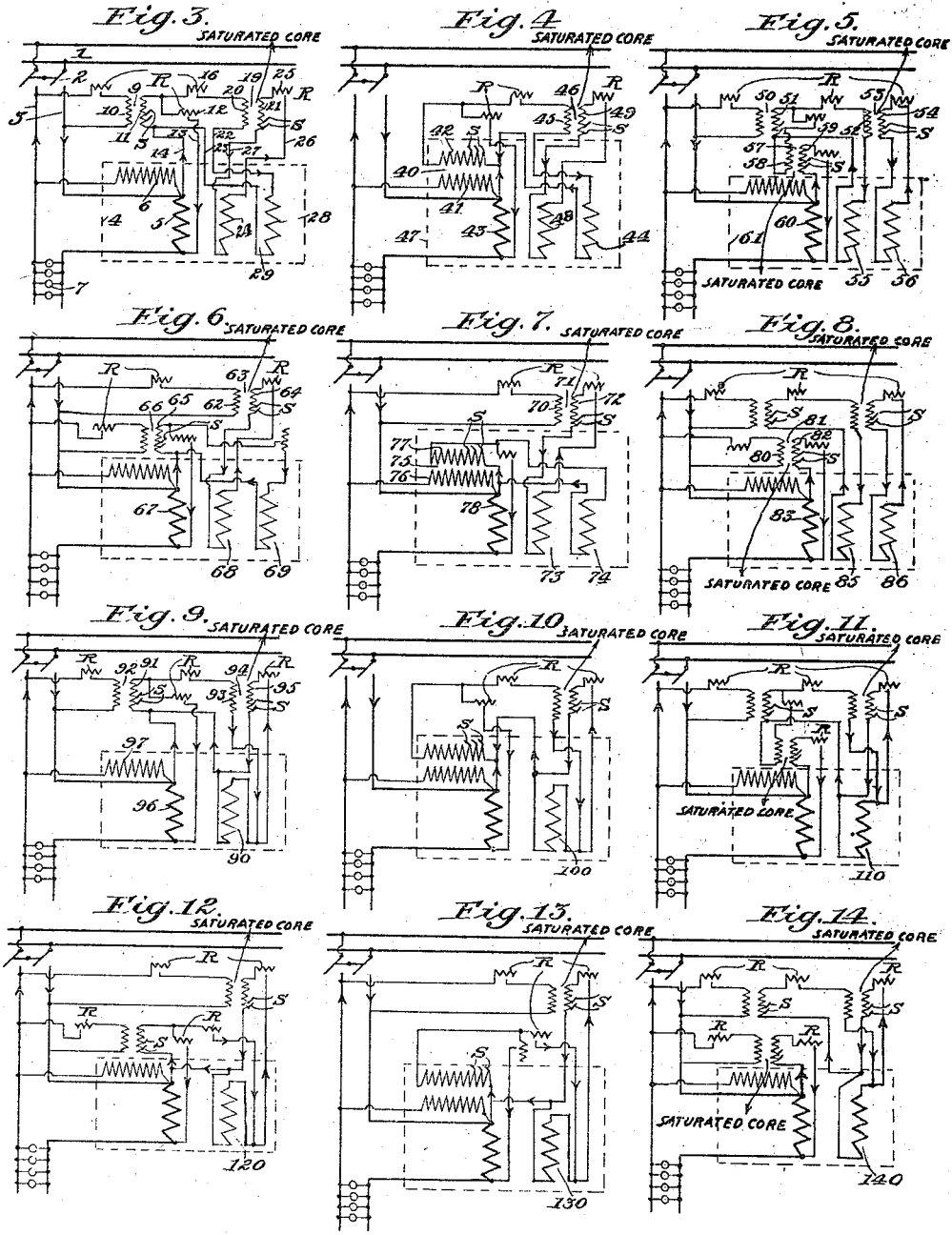

UNITED STATES PATENT OFFICE.

ALFRED W. BURKE, OF WILMINGTON, DELAWARE.

EXCESS-WATTMETER.

1,284,230.   Specification of Letters Patent.   Patented Nov. 12, 1918.

Application filed August 23, 1915. Serial No. 46,974.

*To all whom it may concern:*

Be it known that I, ALFRED W. BURKE, a subject of the King of Great Britain, residing at Wilmington, in the county of New Castle and State of Delaware, have invented certain new and useful Improvements in Excess-Wattmeters, of which the following is a specification.

This invention relates to recording watt-meters, such as are used on alternating current circuits, for recording the electrical energy consumed in excess of a certain predetermined quantity, and has for its object to provide means to automatically correct the error in watt-meters of this kind, due to an increase or decrease in line voltage. This invention is an improvement on those described in my prior patent, Ser. No. 1,175,508, and my copending application, Serial No. 11,484, filed March 2, 1915.

The earlier of these applications discloses means to apply a neutralizing or balancing force to the series coil of the watt-meter so as to neutralize or balance a similar force at the series coil caused by the consumption of the maximum quantity of electrical power contracted for; any electrical power used in excess of that quantity not being neutralized or balanced at the series coil, but actuating the meter proportionally to the excess quantity used, and only this excess being recorded.

In the later application above noted, a modification including a compensator is described, the purpose of which is to correct the error due to the fluctuation in line voltage, whereby the accuracy of the meter is considerably increased, the function of the compensator being to supply an electromotive force, and also a current, of as nearly as possible constant value, to neutralize or balance potential at the terminals of, or the magnetic flux of, the series coil of the watt-meter, regardless of the variation in line voltage. The compensator is a specially designed transformer, operating at above the magnetic saturation point of the iron core, whereby a substantially uniform potential is induced in its secondary, notwithstanding considerable variations in the line voltage.

In order to still further eliminate the effects of variations in line voltage upon the accuracy of the meters, an additional or supplementary balancing means is associated with the meter, as hereinafter described.

In the accompanying drawings,—

Figure 1:
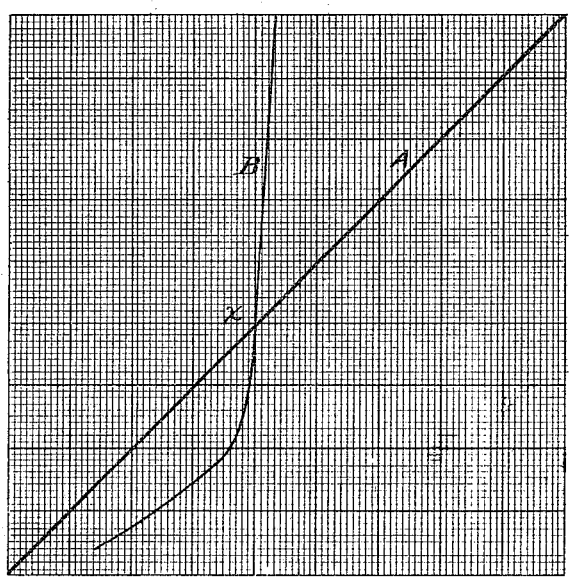
Figure 16:
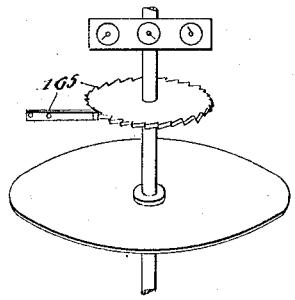
Figure 2:
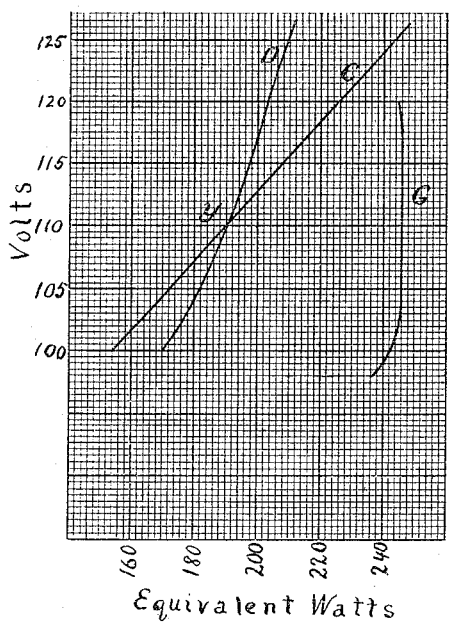

Figure 1 gives curves showing the current induced in the secondary circuit of a compensator, the circuit remaining unchanged, with a variable current in the primary;

Fig. 2 gives curves showing the equivalent watts recorded by a watt-meter without a compensator, with a compensator but without balancing means, and with a compensator with balancing means;

Figs. 3 to 15 are diagrams of connections of a watt-meter equipped with compensators and balancing means; and Fig. 16 shows an intermittent-grip device to permit rotation of the meter in one direction only.

In Fig. 1, curve A indicates the variation in current in the primary of a compensator due to the fluctuation of line voltage; and curve B indicates the variation in current flowing in the secondary of the compensator during the fluctuation of line voltage. The currents have equal values at "$x$", the point of intersection of the curves. It will be noted that above "$x$", the increase in current (curve B) in the compensator secondary is practically negligible, notwithstanding a considerable increase in the primary current, owing to the magnetic core being operated at above the saturation point. The compensator is so operated that its secondary current is always above the point "$x$".

In Fig. 2, curve C indicates the equivalent watts recorded by a watt-meter without a compensator; the increase in equivalent watts recorded is due to the variation in line voltage.

Curve D indicates the equivalent watts recorded by a watt-meter when provided with a compensator, as described in my copending application Serial No. 11,484, above noted. At the point of intersection "$y$" of curves "C" and "D", the line voltage is normal, and the equivalent watts recorded by a watt-meter at normal voltage with or without a compensator would, consequently, be normal also. Above and below the point of intersection, the error is less than without a compensator.

An examination of curves B, C, and D indicates that the increase or decrease in equivalent watts recorded at constant load with the compensator during a variation in line voltage, is caused by the effect of this voltage variation upon the potential coil of the watt-meter, its effect upon the series coil being automatically taken care of by the compensator. To counteract and balance its effect upon the potential coil, the supplementary balancing means are provided.

Curve "G" indicates the watts recorded by a watt-meter, provided with supplementary balancing means, throughout the variation in line voltage indicated, the watts recorded on the test instrument remaining unchanged from seven and one-half volts below, to ten volts above normal.

In Fig. 3, current from the service line 1 passes the switch 2 and enters the house-mains 3, passing through the series coil 5 of the watt-meter 4, and the lamps or other translating devices 7. The shunt coil of the watt-meter is shown at 6. A transformer 9 has its primary 10 connected in shunt across the house-mains 3, the secondary 11 of the transformer supplying two circuits, one through the variable resistance 12, and connecting wires 13, 14 to the ends of the series coil 5; and the other through the variable resistance 16, primary 20 of the compensator 19, connecting wires 22, 23, and one element 28 of the balancing means. The secondary 21 of compensator 19 is connected through the variable resistance 25 connecting wires 26, 27, and the other element 24 of the balancing means, the coils 24 and 28 together constituting the balancing means 29 of two elements, and suitably located in an operative position in the meter. The several circuits are so connected that the instantaneous directions of the currents passing are as represented by the arrow-heads. The effective electromotive force induced in the secondary 11 of the transformer 9 and applied to the terminals of the series coil 5, through connecting wires 13, 14 is opposed to and just balances and neutralizes the difference of potential normally at the terminals of the series coil, when a predetermined current is traversing the house-mains 3, thereby preventing the forward rotation of the meter by currents equal to, or less than, the predetermined current strength. The reverse rotation of the meter is prevented by the brake 165, Fig. 16. When the current in the house-mains 3 exceeds the predetermined current strength, the potential difference at the terminals of the series coil 5, due to such current traversing the coil, exceeds and overbalances that applied thereto by the secondary coil 11 of the transformer, and the meter is, accordingly, positively actuated proportionally to the excess potential difference, which corresponds directly to the excess current. The supplementary balancing means 29 consisting of coils 24 and 28 are so wound, adjusted, and connected that their fluxes neutralize each other when the service line voltage is normal; they consequently do not then influence the watt-meter, the balancing means being inactive. With an increase in the line voltage, the current flowing through the balancing coil 28 increases, being represented by that portion of curve A above X, Fig. 1, this coil now generating a greater magnetic flux than coil 24; with a decrease in the line voltage, the current flowing through the coil 28 decreases, being represented by that portion of curve A below X, the coil 28 consequently generating a smaller magnetic flux than coil 24. The current flowing through the secondary 21 of the compensator 19, and coil 24, remains substantially constant, regardless of the line voltage, this current being represented by curve B, since the magnetic core of the compensator is always saturated even with a low voltage on the service lines. The induction devices comprising the secondary 11 and circuit 13, 14, primary 20, circuit 22, 23 and coil 28, and secondary 21, circuit 26, 27 and coil 24 are so designed that they produce together at all times, in opposition to the normal action of the current coil, a magnetic effect which corresponds to a load current equaling the quotient of a fixed predetermined quantity of electric power divided by the potential across the load devices. Thus, when the predetermined quantity of power is 1000 watts and the voltage is 100 volts, the magnetic effect in opposition to the current coil would correspond to that produced by a current equaling $$\frac{1000}{100} = 10 \text{ amp.}$$

When the voltage rises to 120 volts, its magnetic effect in opposition to the current coil would correspond to that produced by a current equaling $\frac{1000}{120}$. In this manner is neutralized in the meter the effect of a fixed predetermined quantity of electric power and not merely the effect of a definite current.

In several of the circuits of this diagram, and in the circuits of the diagrams showing the modifications of the connections, resistances R, which may be of the inductive or non-inductive type, are inserted to permit adjustment to local conditions. Each secondary coil of the transformers and compensators is also provided with connection terminals S for the same reason.

Fig. 4 is identical in operation with Fig.

3; its transformer 40 has for its primary the shunt coil 41 of the watt-meter 47, its secondary 42 being connected to the series coil 43 of the watt-meter, and to one element 44 of the balancing means, and to the primary 45 of the compensator 46; the element 44 and primary 45 being connected in series, as in Fig. 3. The other element 48 of the balancing means is connected to the secondary 49 of the compensator 46. The connections are otherwise as shown in Fig. 3.

Fig. 5 is a modification of Fig. 3 in which the secondary 51 of transformer 50 is connected in series with the primary 52 of the compensator 53, and the balancing coil 55, the secondary 54 of the compensator 53 supplying the balancing coil 56. The compensator 57 has its primary 58 connected in shunt to the secondary 51 of transformer 50, and its secondary 59 connected to the terminals of the series coil 60 of the watt-meter 61.

Comparing Figs. 3 and 5, it will be noted that in Fig. 3, the series coil 5 of the watt-meter is connected with the secondary of transformer 9, while in Fig. 5 the series coil 60 is connected in the same manner with the secondary 59 of the compensator 57. In Fig. 3, the balancing coil 24 is connected to the secondary of the compensator 19, while in Fig. 5 the balancing coil 55 is connected in series with the primary 52 of compensator 53, and the secondary 51 of the transformer 50. In Fig. 3 the balancing coil 28 is connected in series with the primary 20 of compensator 19 and the secondary of the transformer 9, while in Fig. 5 the balancing coil 56 is connected to the secondary 54 of the compensator 53. In Fig. 3, the series coil 5 of the watt-meter 4 has applied to it from the secondary 11 an induced potential that varies with the voltage on the line, and is balanced by a coil 24 of constant current, and further balanced by a coil 28 of variable current from secondary 11; while in Fig. 5, the series coil 60 of the watt-meter has applied to it from the secondary 59 of compensator 57, a potential that is substantially constant, and is balanced by coil 55 supplied by a variable current from the secondary 51 of the transformer 50, and is further balanced by a coil 56 from the compensator 53.

Fig. 6 is a modification of Fig. 3, the primary 62 of the compensator 63 being connected direct to the service line, and its secondary 64 being connected to one element 68 of the balancing means, as in Fig. 3; the secondary 65 of transformer 66 being connected to the series coil 67 in the watt-meter, and also to the other element 69 of the balancing means.

Fig. 7 is a modification of Fig. 4 in which the primary 70 of the compensator 71 is connected to the service line, its secondary 72 being connected to one element 73 of the balancing means; the transformer 75 has for its primary the shunt coil 76 of the watt-meter; and its secondary coil 77 is connected to the series coil 78 of the watt-meter and to the other element 74 of the balancing means.

Fig. 8 is a modification of Fig. 5 in which the primary 80 of the compensator 81 is connected direct to the service line, its secondary 82 being connected to the terminals of the series coil 83 of the watt-meter. The balancing coils 85 and 86 are connected as described for coils 55 and 56, respectively, under Fig. 5, the operation being otherwise the same.

Fig. 9 is a modification of Fig. 3 in which the single element balancing means or coil 90 replaces the two elements 24, 28 of the balancing means 29 of Fig. 3. The secondary 91 of transformer 92 is connected to the primary 93 of the compensator 94 and to the terminals of the balancing means 90; the secondary 95 of the compensator 94 being also connected to the balancing means, the remaining connections being as in Fig. 3. The instantaneous directions of all currents are shown by the arrow-heads. The coils 90, 93, and 95 are so wound, adjusted, and electrically connected, that when the line voltage is normal, a predetermined voltage is induced in the secondary 91 of the transformer 92, and no current flows through the balancing coil 90, since in the secondary 95 of the compensator 94 there is always induced a predetermined voltage, constant within the ordinary limits of line-voltage variation, the secondaries 91 and 95 being connected, and adjusted by the resistances and the extra terminals on the secondaries, in such a manner that no current flows through coil 90 when the currents in the circuits connected to the balancing means are equal. An excess voltage on the main line, however, will cause a proportional current to pass through coil 90 in one direction, since there is an increased voltage induced in the secondary 91 of the transformer 92; while a decrease in line voltage will cause a proportional current from the compensator to pass through the coil 90 in the opposite direction, since there is a decreased voltage induced in the secondary 91 of the transformer 92. The magnetic flux developed by coil 90 will therefore depend upon and vary with the voltage on the main line. With an increase in line voltage, the magnetic flux of coil 90 will react upon the series coil 96 of the watt-meter, balancing and neutralizing a quantity of magnetic flux in its effect upon the meter proportional to the increase in flux of the shunt coil 97 of the watt-meter caused by the increase in line voltage. With a decrease in line voltage, the magnetic flux of coil 90 will have an opposite sign, and balance and neutralize the effect of the reduced flux of the shunt coil 97 in its effect upon the meter.

Fig. 10 is a modification of Fig. 4, in which the balancing coil 100 replaces the coils 44, 48 of the balancing means in Fig. 4, and serves the same function as the balancing coil 90 in Fig. 9. The electrical and magnetic reactions described under Fig. 9 take place in this modification, also.

Fig. 11 is a modification of Fig. 5, in which the balancing coil 110 replaces the coils 55, 56 of the balancing means in Fig. 5, and serves the same function as the balancing coil 90 in Fig. 9. The electrical and magnetic reactions described under Fig. 9 take place in this modification, also.

Fig. 12 is a modification of Fig. 6, in which the balancing coil 120 replaces the balancing coils 68 and 69 in Fig. 6, and serves the same function as the balancing coil 90 in Fig. 9. The electrical and magnetic reactions described under Fig. 9 take place in this modification, also.

Fig. 13 is a modification of Fig. 7, in which the balancing coil 130 replaces the balancing coils 73 and 74 in Fig. 7, and serves the same function as the balancing coil 90 in Fig. 9. The electrical and magnetic reactions described under Fig. 9 take place in this modification, also.

Fig. 14 is a modification of Fig. 8, in which the balancing coil 140 replaces the balancing coils 85 and 86 in Fig. 8, and serves the same function as the balancing coil 90 in Fig. 9. The electrical and magnetic reactions described under Fig. 9 take place in this modification, also.

Figure 15:
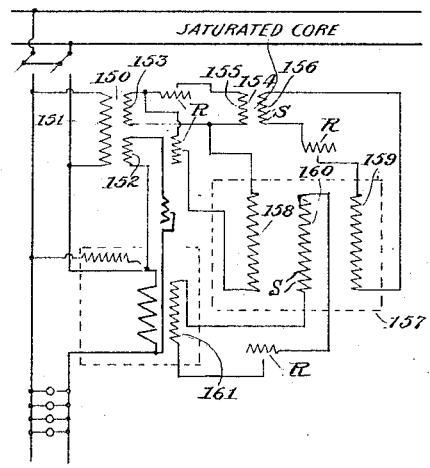

Fig. 15 is a modification in which the transformer 150 is provided with a single primary 151, and two secondaries 152 and 153; secondary 152 being connected to the terminals of the series coil of the watt-meter, while secondary 153 supplies two circuits, one including primary 155 of compensator 154, and the other the primary 158 of the double primary transformer 157, the secondary 156 of the compensator 154 being connected to the other primary 159 of transformer 157. The secondary 160 of the transformer 157 is connected to the balancing coil 161 in the watt-meter. The two primaries 158 and 159 are of equal size, and are connected to reverse or neutralize each other in their effects upon the secondary 160. Primary 158 being connected to the secondary 153 of transformer 150 receives a current the voltage of which varies with the line voltage, while the primary 159 being connected to the secondary 156 of the compensator 154, receives its current at constant voltage, regardless of the variation in the line-voltage. When the line-voltage is normal, no current is induced in the secondary 160, since the primaries 158 and 159 are then equal and opposite in their effects upon the secondary, and therefore no current is supplied to the balancing coil 161; with an increase in line voltage, a higher voltage is supplied to the primary 158, inducing a current in the secondary 160 proportional to the difference between the voltages at the primaries 158 and 159, the secondary current passing through the balancing coil 161, and neutralizing the effect of the increased line voltage upon the shunt coil of the watt-meter; with a decrease in line voltage, a lower voltage is supplied to the primary 158, resulting in a current being induced in the secondary 160 from the primary 159, connected to the compensator, proportional to the difference between the voltages supplied to the primaries 158 and 159, the induced current in the secondary balancing the effect of the reduction in line voltage on the watt-meter. Resistances R are suitably placed in the circuits to adjust the meter to local conditions.

Fig. 16 illustrates one type of an intermittent grip device, described in my copending application, Serial No. 813,494, above noted. The pawl and ratchet 165 permit rotation of the meter in one direction only, preventing the meter from reversing when the current being consumed is less than the quantity contracted for.

I claim:—

1. In an apparatus for measuring electric energy comprising a current coil and a voltage coil, means operatively associated with said coils for neutralizing in the apparatus the effect of a predetermined fixed quantity of electric power.

2. In an apparatus for measuring electric energy comprising a current coil and a voltage coil, means operatively associated with the said current coil for neutralizing in the apparatus the effect of a predetermined fixed quantity of electric power.

3. In an apparatus for measuring electric energy comprising a current coil and a voltage coil, means including induction devices associated with the said current coil and constructed and arranged to neutralize by their combined action therewith in the apparatus the effect of a predetermined fixed quantity of electric power.

4. In an apparatus for measuring electric energy comprising a current coil, a voltage coil and means associated with the current coil for neutralizing therein the effect of a current corresponding in value to the quotient of the predetermined fixed quantity of electric power divided by the line voltage.

5. In an apparatus for measuring electric energy comprising a current coil, a voltage coil, means for neutralizing in the current coil the effects of a predetermined current at a predetermined voltage value, and means for increasing the said neutralizing action when the voltage falls below the predetermined value and for decreasing the neutralizing action when the voltage rises above the predetermined value.

6. In an apparatus for measuring electric energy comprising a current coil, a voltage coil, means for producing a constant current to neutralize in the current coil the effects of a predetermined current at a predetermined voltage value and means for producing a variable current to increase the action of the said constant current when the voltage falls below the predetermined value and to decrease the action of said constant current when the voltage rises above the predetermined value.

7. In an apparatus for measuring electric energy comprising a current coil, a voltage coil, means for producing a constant current to neutralize in the current coil the effects of a predetermined current at a predetermined voltage value and means constructed and arranged to produce zero magnetic effect when the voltage has the predetermined value, to produce a magnetic effect in opposition to the normal action of the current coil when the voltage decreases below the predetermined value and to produce a magnetic effect to increase the normal action of the current coil when the voltage increases above the predetermined value.

8. In an apparatus for measuring electric energy comprising a current coil, a voltage coil, means for producing a constant current to neutralize in the current coil the effects of a predetermined current at a predetermined voltage value, a compensating device associated with the current coil for modifying the action of said constant current, said compensating device comprising means for producing a constant current and means for producing a variable current passing through zero value when the voltage has the predetermined value and means for compounding the two currents.

9. In an apparatus for measuring electric energy, the combination of a current coil, a voltage coil, current inducing devices, one of said current inducing devices being connected to the current coil to neutralize the magnetic effect thereof for a predetermined current flow in the line, other current inducing devices and electro-magnetic means connected therewith, said last-mentioned current inducing devices and electro-magnetic means being constructed and arranged to produce a resultant magnetic effect proportional to an increase of line voltage above and a decrease below a predetermined value.

10. In an apparatus for measuring electric energy the combination of a current coil, a voltage coil, current inducing devices, circuits therefor, one of said current inducing devices being connected to the current coil to neutralize the magnetic effect thereof for a predetermined flow in the line, other of said current inducing devices being constructed and arranged to produce a resultant current proportional to an increase of the line voltage above and a decrease below a predetermined value and electro-magnetic means for causing the said resultant current to react on one of the coils of the apparatus.

11. In an apparatus for measuring electric energy the combination of a current coil, a voltage coil, current inducing devices, one of said current inducing devices completing a circuit through the current coil and adapted to neutralize the magnetic effect thereof for a predetermined current flow in the line, another of said devices producing a constant current proportional to a predetermined normal line voltage, still another of said devices producing a current proportional to the line voltage and electromagnetic means for compounding said currents and causing the resultant current to react on one of the coils of the apparatus.

12. In an apparatus for measuring electric energy the combination of a current coil, a voltage coil, current inducing devices, one of said current inducing devices comprising a magnetically highly saturated transformer having a secondary connected to the current coil to neutralize the magnetic effect thereof for a predetermined current flow in the line, another current inducing device responsive to an increase of the line voltage above and a decrease below a predetermined value, still another current inducing device comprising a magnetically highly saturated transformer for producing a constant current and electro-magnetic means connected with the two last-mentioned devices for producing a resultant magnetic effect to react on one of the coils of the apparatus.

13. In an apparatus for measuring electric energy the combination of a current coil, a voltage coil, a magnetically highly saturated transformer having its secondary connected across the current coil to cause a constant current to flow in opposition to the normal current, a transformer having a secondary responsive to an increase of line voltage above and a decrease below a predetermined value, a magnetically highly saturated transformer for producing a constant current and electro-magnetic means connected to the two last-mentioned transformer secondaries for producing a resultant magnetic effect to react on one of the coils of the apparatus.

14. In an apparatus for measuring electric energy the combination of a current coil, a voltage coil, a current inducing device connected to the current coil to neutralize the magnetic effect thereof for a predetermined current flow in the line, a current inducing device responsive to an increase of line voltage above and a decrease below a predetermined value, a current inducing device for producing a constant current proportional to the predetermined value, electro-magnetic means connected to the said two last-mentioned devices for producing a resultant magnetic effect to react on one of the coils of the apparatus, and means for regulating the strength of the current in said current inducing devices.

15. The method of measuring electric currents, which consists in passing the current to be measured through a coil in a measuring instrument in series with translating devices, applying the neutralizing force of an induced opposing current of predetermined strength to said series coil, supplementing the neutralizing effect of said induced opposing current by a variable balancing force varying with the variation of voltage at which said current to be measured is supplied, and actuating said instrument by that portion of the current to be measured in excess of the amount neutralized by the joint action of the opposing current and supplemental balancing force.

In testimony whereof I affix my signature in presence of two witnesses.

ALFRED W. BURKE.

Witnesses:
EMMA SBRITSKY,
WILLIAM A. DANNENHAUER.

Copies of this patent may be obtained for five cents each, by addressing the "Commissioner of Patents, Washington, D. C."